United States Patent
Halberstadt

(10) Patent No.: US 8,422,250 B2
(45) Date of Patent: *Apr. 16, 2013

(54) CONTROL OF A RESONANT CONVERTER BY SETTING UP CRITERIA FOR STATE PARAMETERS OF THE RESONANT CONVERTER

(75) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 928 days.

This patent is subject to a terminal disclaimer.

(21) Appl. No.: 11/910,448

(22) PCT Filed: Mar. 23, 2006

(86) PCT No.: PCT/IB2006/050900
§ 371 (c)(1),
(2), (4) Date: Oct. 12, 2009

(87) PCT Pub. No.: WO2006/103606
PCT Pub. Date: Oct. 5, 2006

(65) Prior Publication Data
US 2010/0033998 A1 Feb. 11, 2010

(30) Foreign Application Priority Data
Apr. 1, 2005 (EP) .................................... 05102603

(51) Int. Cl.
*H02M 3/335* (2006.01)
(52) U.S. Cl.
USPC .......................................... 363/21.03; 363/97
(58) Field of Classification Search ............... 363/21.02, 363/21.03, 97
See application file for complete search history.

(56) References Cited

U.S. PATENT DOCUMENTS

| | | | |
|---|---|---|---|
| 5,448,466 A * | 9/1995 | Erckert | 363/16 |
| 5,615,093 A * | 3/1997 | Nalbant | 363/25 |
| 7,944,716 B2 * | 5/2011 | Halberstadt | 363/25 |
| 2001/0036090 A1 | 11/2001 | Halberstadt | |
| 2007/0165426 A1 * | 7/2007 | Kyono | 363/21.02 |
| 2008/0037293 A1 * | 2/2008 | Jacques et al. | 363/21.03 |
| 2008/0101103 A1 * | 5/2008 | Sato | 363/97 |
| 2009/0251929 A1 * | 10/2009 | Choi | 363/21.02 |
| 2010/0020569 A1 * | 1/2010 | Melanson et al. | 363/21.03 |
| 2010/0033998 A1 * | 2/2010 | Halberstadt | 363/97 |
| 2011/0149607 A1 * | 6/2011 | Jungreis et al. | 363/21.02 |
| 2011/0157920 A1 * | 6/2011 | Adragna et al. | 363/21.03 |
| 2011/0228566 A1 * | 9/2011 | Liang | 363/21.02 |
| 2011/0242856 A1 * | 10/2011 | Halberstadt | 363/17 |
| 2012/0087155 A1 * | 4/2012 | Tang et al. | 363/21.02 |
| 2012/0134705 A1 * | 5/2012 | Fukutani | 399/88 |

FOREIGN PATENT DOCUMENTS
EP 0655830 A1 11/1994

* cited by examiner

*Primary Examiner* — Jeffrey Sterrett

(57) ABSTRACT

The invention deals with the control of a resonant LLC converter by setting up criteria for state parameters of the resonant converter, so that the converter may be operated in a near capacitive mode. The current flowing in the resonant tank and optionally the voltage at the a predetermined point in the resonant tank are monitored, and wherein a switch (a high side switch or a low side switch) is turned off when a first criterion is fulfilled together with a second criterion or optionally a third criterion, the first criterion ensuring a minimum time has lapsed after the switch is turned on, the second criterion being that the absolute value of the current is reaching a predetermined current level, the third criterion being that the voltage at the predetermined point reaches a predetermined voltage level.

10 Claims, 4 Drawing Sheets

Rs=Current Sense Resistor

CONTROL OF A RESONANT CONVERTER BY SETTING UP CRITERIA FOR STATE PARAMETERS OF THE RESONANT CONVERTER

FIELD OF THE INVENTION

The invention relates to control of a resonant converter, and in particular to the control of a near capacitive mode in the resonant converter.

BACKGROUND OF THE INVENTION

In order to achieve a satisfactory operation of a resonant converter, it is important that switches for generating an alternating current are switched on and off at the right instant. A frequency at which the switches are operated defines a mode of operation of the converter. If the frequency is sufficiently high, the energy converter operates in a regular inductive mode.

The converter operates in a near-capacitive mode when the switching frequency of the switches, and hence the frequency of the alternating current through the primary side of the transformer is decreased to a point where the alternating current is at least almost in phase with a alternating current at a bridge node.

Generally, it is desirable that the energy converter operates in the inductive mode. To this end, it is important that the non-overlap time is chosen to be sufficiently long to prevent hard switching, resulting in switching losses. However, the non-overlap time is bound to a maximum because hard switching also occurs in the case of a too long overlap time so that switching losses occur.

In US patent application 2001/0036090 a control algorithm of the switches is disclosed where the switch turn on moment is determined in such a way that the switch is turned on close to the top (high side switch turn on) or valley (low side switch turn on) of a half bridge switching node. In this way minimum voltage drop occurs over the switch at the moment that it is turned on, at a given current in the transformers primary side, providing minimum switching losses. The turn off moment is determined in a known manner. A known manner may e.g. be increasing the switching frequency. The amplitude of hard switching is then measured and used to regulate the frequency to just that values that gives the desired amplitude of hard switching. A disadvantage of this method is it may be difficult to stabilize the converter.

SUMMARY OF THE INVENTION

The present invention seeks to provide an improved resonant converter. The invention is defined by the independent claims. The dependent claims define advantageous embodiments.

In one embodiment, the object is achieved by providing improved means to control the converter (e.g. a near capacitive mode resonant converter) so that a simpler, more robust and cheaper resonant converter may be provided. Preferably, the invention alleviates, mitigates or eliminates one or more of the above or other disadvantages singly or in any combination.

In one embodiment, a resonant converter is thus provided where at least one state variable, and optionally two, is monitored and where a control algorithm is implemented to ensure inductive mode operation, i.e. to avoid capacitive mode operation. The capacitive mode may be prevented, e.g. by turning off the conducting switch before the current in the resonant tank reverses. The current flowing in the resonant tank is also referred to as the primary current.

Operating the resonant converter in this manner gives rise to a number of advantages. Operating the switches directly from monitoring the primary current and optionally the capacitor voltage can lead to a faster control and better stability of the system.

A further advantage is that a soft switch-on of each switch with minimum turn on losses may be obtained, by comparing the primary current and optionally the capacitor voltage in the circuit for each conduction interval with a reference value. The reference value may e.g. be representing a minimum energy for charging the capacitance at the half bridge point to an opposite supply rail. An even further advantage is that it is possible to create a cycle-by-cycle near capacitive mode protection. One of the possible technical effects obtained by a cycle-by-cycle near capacitive mode protection is that no frequency regulation loop is necessary, because the converter is no longer controlled by a frequency. Instead it is controlled cycle-by-cycle. A cycle-by-cycle NCM, Near Capacitive Mode, protection furthermore gives the possible technical effects of instant capacitive mode protection without practical limitation for speed of the main control loop and/or instant capacitive mode protection for duty cycles different from 50% with operation up to the NCM border for the high side switch (HSS) and the low side switch (LSS).

An important advantage of an embodiment of the present invention compared with the state of art technology is that the necessary action may be taken in advance, preventing the converter from entering into the capacitive mode, also during transients that occur in both the supply voltage or load.

An even further advantage is that hard switching may be prevented since, HSS or LSS may be turned off at a certain current, while the absolute value of this current is falling to zero after it has first reached its maximum value during the switch conduction interval thereby preventing zero crossing of the current and therefore hard switching.

The optional features as defined in claims 2 to 4 are advantageous since in addition to setting up specific criteria of the primary current and optionally the capacitor voltage in relation to control parameters, it may be ensured that although a criterion is fulfilled in the beginning of a conduction interval, it can be disregarded. It is to be understood that the fulfillment of the criterion that a minimum time has lapsed, is not necessarily obtained by a timer means. This may e.g. also be obtained from a known development of the primary current and/or the voltage at a predetermined point in relation to a specific criterion, or other equivalent means.

The optional features as defined in claims 5 to 7 are advantageous since different predetermined values may be specified for conduction intervals relating to different switches.

According to additional aspects of the invention there are provided control logic for controlling a resonant converter, a method of controlling a resonant converter and a computer readable code adapted to perform the steps of the method. In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF PREFERRED EMBODIMENTS

Figure 1:
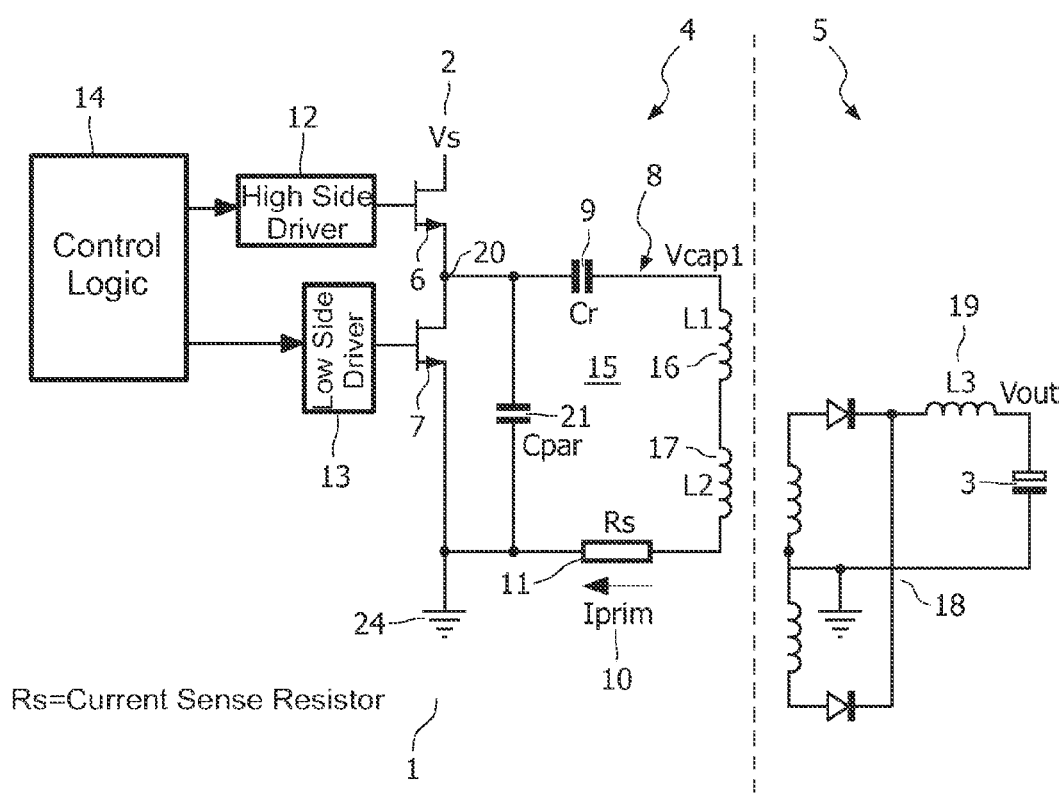
FIG. 1 illustrates a basic diagram of a resonant LLC converter.

FIG. 1 illustrates a basic diagram of a resonant LLC converter 1 which is formed as a resonant half-bridge converter. The converter comprises a transformer having a primary side 4 and a secondary side 5. The converter 1 is adapted to supply electric energy from a DC energy supply source, Vs 2 on the primary side of the transformer, to a load (not shown) connected at Vout 3 on the secondary side of the transformer.

Furthermore, the converter comprises a first and a second controllable switch, here denoted as a High Side (HS) controllable switch 6 and a Low Side (LS) controllable switch 7. The switches are arranged in series with each other. The high side and low side switches may, for example, be a transistor, a thyristor, a MOSFET, etc.

A resonant capacitor Cr 9 of the LLC converter is having a certain voltage Vcap1 8 at a point in the circuit. In the resonant tank 15 a current, Iprim 10 is flowing. The voltage Vcap1 is also referred to as the capacitor voltage, the voltage Vcap1 is the voltage at the predetermined point. The predetermined point is in this embodiment indicated in connection with Vcap1 on FIG. 1.

It is shown that a high side driver 12 connected to the high side switch 6 may drive the high side switch, HSS switch, and that the low side switch 7 may be driven by a low side driver 13 connected to the low side switch. The high and low side drivers are connected to control logic 14.

In the converter the resonant capacitor Cr 9, an inductance L1 16 and magnetizing inductance L2 17 form a resonant circuit. A transformer and rectifier circuit 18 is used here to create a DC output voltage. The output current can be made continuous by adding a series inductance L3 19. There are a lot of variations on this converter, for example rectification with a bridge rectifier or no rectification at all as used in a lighting application. Also the transformer can be left out in some cases.

The converter is in most cases used in the inductive region. In this region, the current in the resonant capacitor Cr 9 keeps flowing in the same direction for a certain time after the conducting switch is turned off. This time is sufficient to charge the half bridge node 20 between resonant capacitor Cr 9 and a parallel capacitor, Cpar 21 to the opposite supply rail prior to the conduction interval of the opposite switch. In this case soft switch on of the switch is provided, preventing extra dissipation in the switch due to dissipating the energy stored in Cpar 21. In the capacitive mode, the current in Cr 9 reverses, before the half bridge point 20 has charged to the opposite supply rail.

There are several methods to prevent the converter from operating in the capacitive mode region.

One known method detects the capacitive mode and then increases the operating frequency temporarily. The disadvantage of this method is that the converter cannot be designed to operate close to capacitive mode during normal operation, because during the sweep in frequency, the power is decreased dramatically during a certain time. Therefore this method is only allowed to act during fault conditions.

Another known method detects the amplitude of hard switching at the half bridge point and limits the operating frequency to the value, corresponding to the maximum allowed amplitude of hard switching. This value is often called Near Capacitive Mode border, NCM border. This state of the art method allows the converter to be designed close to capacitive mode, however due to the bad stability of this near capacitive mode regulation loop, the bandwidth of this loop must be chosen small. Therefore the loop can give problems in combination with load steps.

The present invention can solve the above disadvantages, where the converter can be used until the near capacitive mode border without stability problems and with fast reaction times.

A high side switch 6 conduction interval is here defined as starting when the high side switch is being turned on, providing a connection between Vsupply 2 and the half bridge node 20. Low side switch 7 conduction interval is here defined as starting when the low side switch is being turned on, providing a connection between the half bridge node 20 and ground 24.

HSS and LSS turn on may be determined by adaptive non-overlap or fixed non-overlap or other criterion according to the state of art technology. This means that the opposite switch is turned on after a fixed time after the conducting switch was turned off. It is also possible to switch the opposite switch on after it is detected that the half bridge has commutated. This is called adaptive non-overlap and can for example be realized by sensing the dV/dt at the half bridge point. The scope of the present invention deals with the criteria for turning off a specific switch, however in order to drive the converter a switch is turned on again, as explained above.

The basic idea is to check for each conduction interval if still enough current is flowing in the resonant capacitor Cr 9 to be able to charge the parallel capacitor Cpar 21 to the opposite supply rail. If the current drops below the minimum level, the corresponding switch will be switched off.

It can be shown that there is a relation between the voltage at the resonant capacitor Vcap1 8 and the primary current, Iprim 10 at the end of the conduction interval at the near capacitive mode border. Therefore also Vcap1 8 can be used to keep the converter outside the capacitive mode region.

Since the conduction interval may only be ended if the primary current, Iprim 10, is on its way back to zero and not during the first part of the conduction interval where the primary current 10 is still building up. Thus, the conduction interval may only be ended after a top or valley has occurred in Iprim 10, depending on the conduction interval (High Side Switch 6, HSS or Low Side Switch 7, LSS).

In an embodiment of the present invention capacitive mode is prevented by use the following control algorithm, the control algorithm is operated by the control logic 14:

HSS Turn Off:
1) [top reached in Iprim] AND
2) [Iprim<Iend_pos] OR [Vcap1<VcapH]

LSS Turn Off:
1) [valley reached in Iprim] AND
2) [Iprim>Iend_neg] OR [Vcap1>VcapL]

As the top and valley detection in the primary current can be problematic e.g. due to the differentiating action in combination with noise and disturbance the top and valley detection may be replaced as follows.

The first criterion [top reached in Iprim] for turn off of the HSS can be replaced by:

The end of a time interval has occurred, where the time interval is started at the following event: [HS switch is turned on AND Iprim>0 is detected]

The first criterion [valley reached in Iprim] for turn off of the LSS can be replaced by:

The end of a time interval has occurred, where the time interval is started at the following event: [LS switch is turned on AND Iprim<0 is detected]

Both criteria have a large practical importance, because a better discrimination between NCM at large load, which the protection must detect, and no load operation with small currents, which the protection may not react on, is provided.

This leads to four control variables that are used to prevent capacitive mode; Iend_pos, Iend_neg, VcapH and VcapL as described above and discussed in connection with FIGS. 2-4.

Other embodiments of the present invention include variations in the control algorithm such as leaving out the top or valley detection in Iprim or substitution of the top or valley by a (fixed) time after the start of the conduction interval, or other compatible criterion.

There are several possibilities to generate values for Iend_pos, Iend_neg, VcapH, VcapL. In an embodiment of the present invention the values may be set as follows.

Iend_pos, Iend_neg, fixed value as determined by lowest supply voltage

VcapH, VcapL, fixed value as determined by lowest supply voltage plus supply voltage compensation.

Amplitude of hard switching in combination with regulation loop that limits the hard switching voltage to a certain maximum value by controlling Iend or Vcap. This can be provided for the end of the HSS or LSS conduction interval (1 loop) or both (2 loops).

The described method of setting values for Iend_pos 31, Iend_neg 32, VcapH 33 and VcapL 34 may be implemented in combination with the control algorithm for HSS 6 and LSS 7 turn off as described.

Figure 2:
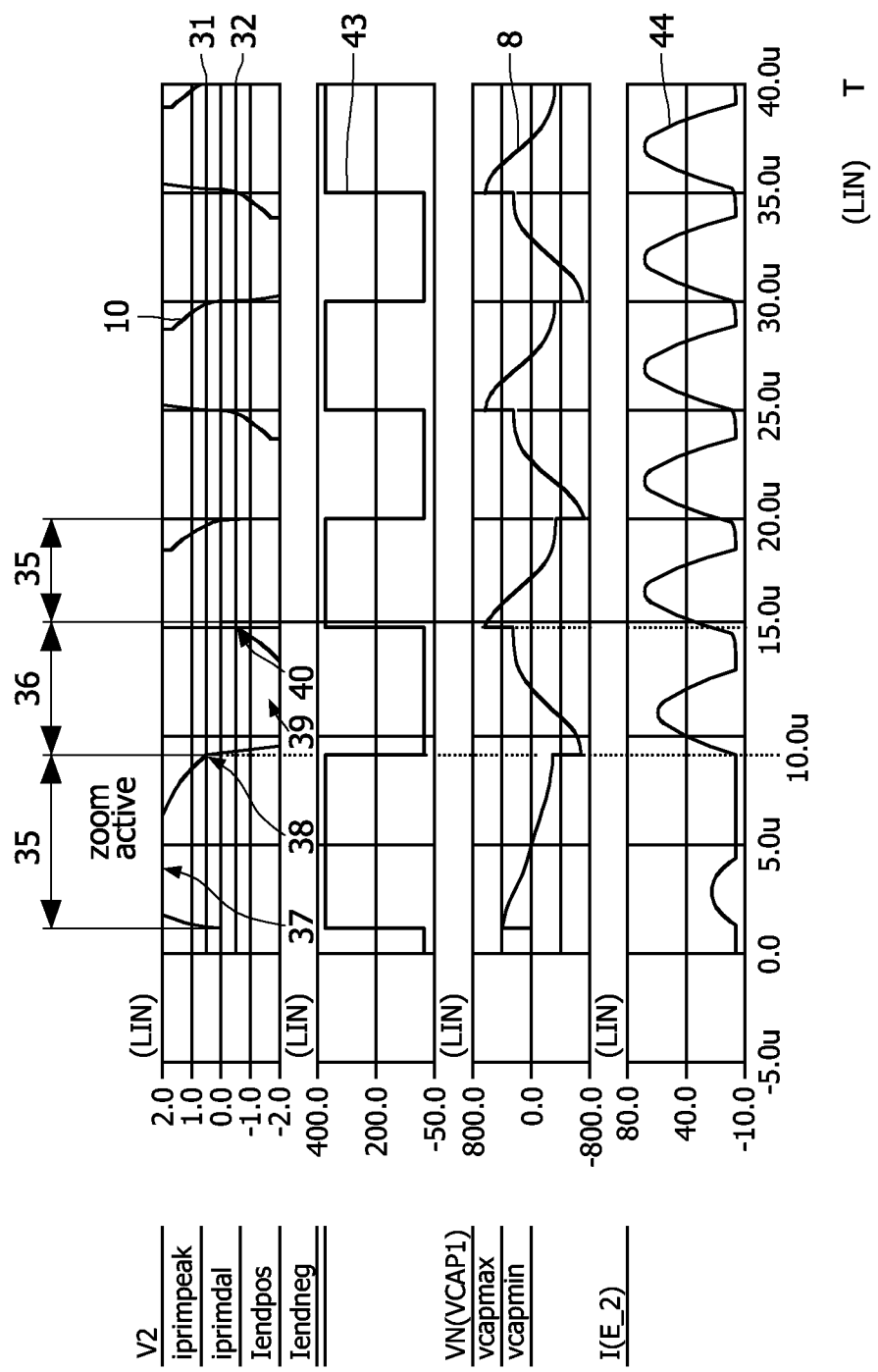
FIG. 2 illustrates the time variations of various parameters in a simulation of a situation of use, using a first set of parameters.

FIG. 2 shows graphs obtained in accordance with an embodiment of the present invention for a NCM limitation, the fig. illustrates control by Iprim 10. Vsupply 2 is set to 400V.

In FIG. 2 the variables are chosen as described in the following: IpeakH=iprimpeak, IpeakL=iprimdal (valley), VcapH 33=vcapmax, VcapL 34=vcapmin, Iendpos 31=iprimpeak, Iendneg 32=iprimdal (valley) V2=Iprim 10, vn(VCAP1)=Vcap1 8 Vn(Vhb1)=voltage at the halfbridge node(Cr/Cpar) 20. I(E_2)=current in L3.

The top most graph shows the current Iprim 10 as a function of time. The second graph shows a voltage 43 at the half bridge node 20 as a function of time. The third graph shows the voltage of the resonant capacitor at Vcap1 8 as a function of time. The forth graph shows a current in L3 44 as a function of time. In all graphs the interval as indicated at 35 is when the high side switch is providing conduction and 36 is when the low side switch is providing conduction.

The top in Iprim during the first conduction interval, where the HSS is turned on, is indicated as the top point 37 of the curve representing Iprim 10 as a function of time. After the point 38 Iprim is also smaller than the control value Iend_pos 31. Accordingly, both the first and second control criteria for the HSS are fulfilled after the point 38 and consequently HSS is turned off.

Similarly, during a following LSS conduction interval, the valley in the curve representing Iprim 10 is reached at the point 39 and the point where Iprim 10 is larger than Iend_neg is reached at 40. Accordingly both the first and second control criteria for the LSS are fulfilled after the point 40 and consequently the LSS is turned off.

An alternative way of ensuring that the value of Iprim is smaller than a positive predetermined value and larger than a negative predetermined value is to ensure that an absolute value of the current in the resonant tank, Iprim 10 is smaller than a predetermined value. Similarly, an alternative way of ensuring that a top of a curve representing currents flowing in a positive direction or a valley of a curve representing currents flowing in a negative direction has been reached is to describe that the maximum level of an absolute current has been reached.

Figure 3:
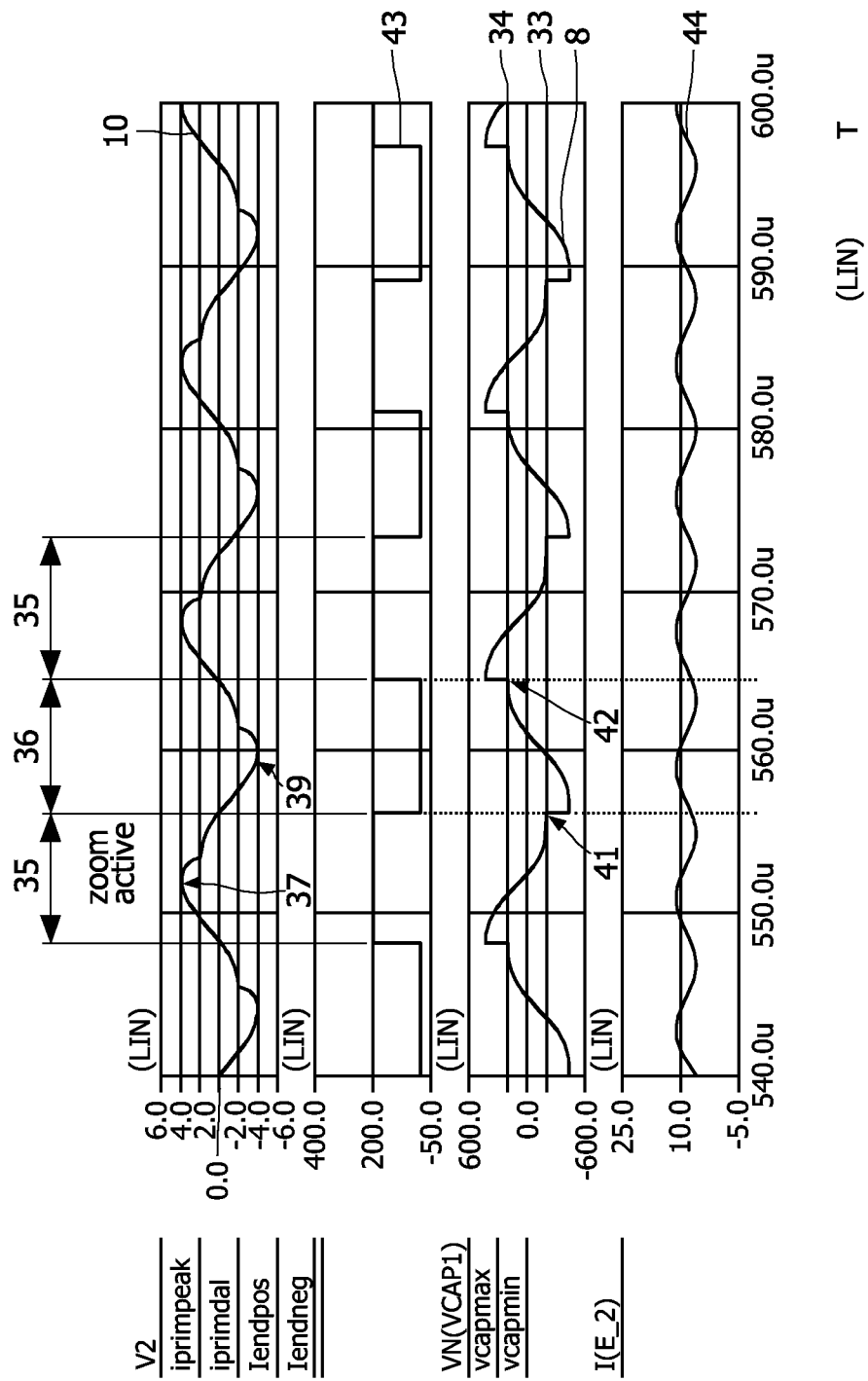
FIG. 3 illustrates the time variations of various parameters in a simulation of a situation of use, using a second set of parameters.

FIG. 3 shows graphs obtained in accordance with an embodiment of the present invention for a NCM limitation, the fig. illustrates control by Vcap1 8. Vsupply is set to 200V.

The topmost graph shows the current Iprim 10 as a function of time. The second graph shows a voltage 43 at the half bridge node 20 as a function of time. The third graph shows the voltage 8 of the resonant capacitor Vcap1 as a function of time. The forth graph shows a current in L3 44 as a function of time. In all graphs the interval as indicated at 35 is when the high side switch is providing conduction and 36 is when the low side switch is providing conduction.

The top in Iprim during the first conduction interval, where the HSS is turned on, is indicated as the top point 37 of the curve representing Iprim 10 as a function of time. After the point 41 Vcap1 is also smaller than the control value VcapH 33. Accordingly, both the first and second control criteria for the HSS turn off are fulfilled after the point 41 and consequently the HSS is turned off.

Similarly, during a following LSS conduction interval, the valley in the curve representing Iprim 10 is reached at the point 39 and the point where Vcap1 8 is larger than VcapL is reached at 42. Accordingly, both the first and second control criteria for the LSS turn off are fulfilled after the point 42 and consequently the LSS is turned off.

Figure 4A:
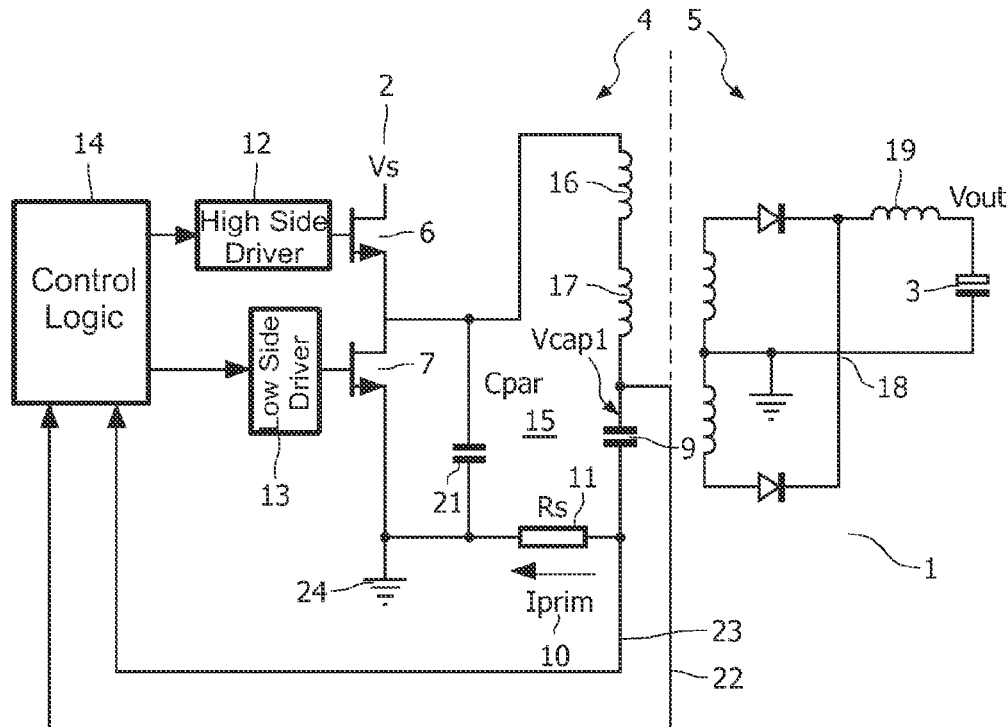
FIG. 4 illustrates an embodiment of the invention with control logic and analogue control functions shown in detail.

In FIG. 4a an embodiment of the present invention is shown. The figure shows a LLC converter as shown in FIG. 1 where the position of the resonant capacitor Cr 9 has been changed to after the two inductances L1 16 and L2 17. This alternation of the circuit has been provided in order to show that the build up of the circuit is not limited to the converter as shown in FIG. 1 or of the converter shown in FIG. 4a.

In FIG. 4a it is shown that the voltage of the resonant capacitor is monitored at Vcap1 at a position different of the position shown in FIG. 1. The voltage over the resonant capacitor Cr,9 can also be measured while it is placed for example between L1 and L2 or at the other side of the current sense resistor Rs (see FIG. 1). Then the desired parameter (voltage at 9) can be constructed by measuring Vhb (20) and Vcr and adding those two. The scope of this patent also covers an embodiment in which Cr is placed between L1 and L2 or between Rs and ground or in which Rs is left out (if the current is measured in another way) and in which Vhb+Vcr is used as replacement for the voltage at 9. As Vcr is in fact the integral of the current in the resonant tank (as the capacitor Cr acts as an integrator), one could also integrate the current and use Vhb+the integrated current as replacement for the voltage measured at 9. Also that embodiment is covered by this patent.

It is also shown that the current in the resonant tank, Iprim 10, is monitored as the current flowing through Rsense 11. Rsense 11 is positioned in a point of the circuit between Cr 9 and ground 24. The current in the circuit may be obtained in any other place in the circuit in any possible way. This may e.g. be as the current running through a switch or as the current measured with an element not in direct connection with the current to be measured, such as an element measuring the magnetic field of the current.

A monitoring signal representing the monitored voltage signal, Vcap1 8 and the monitored current, Iprim 10 is fed back to the Control logic 14 through monitoring lines 22 and 23 respectively.

The invention can also be used in combination with a full bridge converter.

Figure 4B:
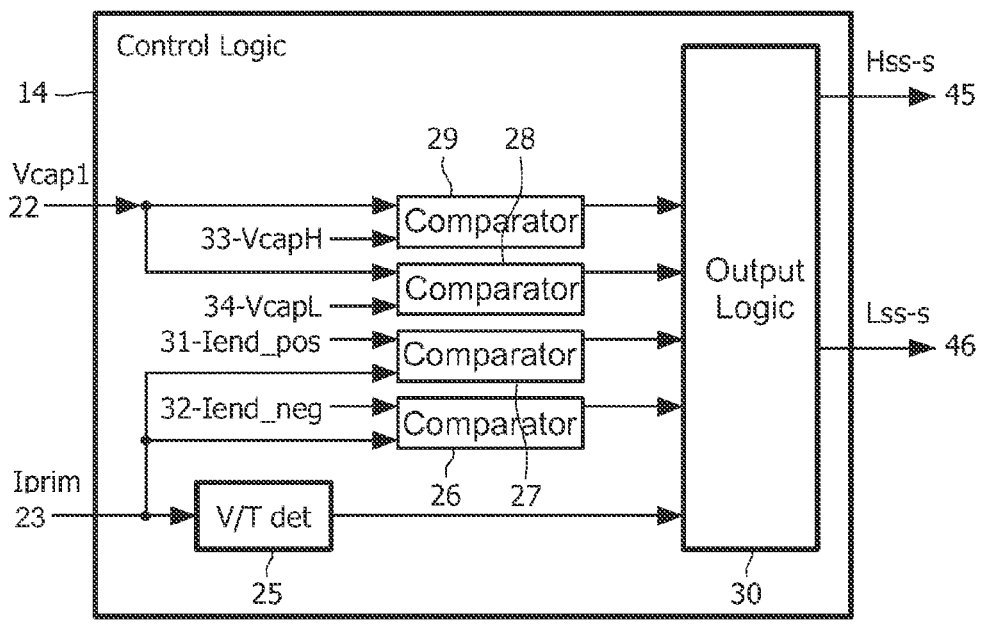

In FIG. 4*b* the device CL, Control Logic and analog control functions, 14 is shown in more detail. The CL block 14 represents functions to realize the proposed control algorithm.

It is seen that the monitoring current signal 23 representing Iprim 10 is inputted in the control logic 14. The control logic 14 comprises a V/T det., Valley and Top detector 25 connected to the monitored current signal 23. The output of the valley and top detector is outputted from the valley and top detector and inputted in OL 30, Output Logic 30 provided in the control logic 14. The output logic comprises latches for providing a state of the HSS and the LSS and a set reset control.

The monitored current signal 23 representing Iprim is furthermore connected to two comparators 26 and 27. The comparators 26 and 27 compares the current signal 23 representing Iprim with a value of the control values Iend_neg 32 and Iend_pos 31 respectively.

It is seen from FIG. 4*b* that the monitored voltage signal 22 representing the voltage Vcap1 8 is connected to two comparators 28 and 29. The comparators 28 and 29 compares the voltage signal 22 representing Vcap1 8 with a value of the control values VcapL 34 and VcapH 33 respectively.

The outcome of the comparison of the comparators 26, 27, 28 and 29 is outputted from the comparators and inputted in the output control logic 30.

The output of the output logic 30 is based on the input from the comparators 26, 27, 28 and 29 and the valley/top detector 25. Based on these input the output logic outputs a HSS and LSS state output 45, 46 for the HS and LS driver 12 and 13.

For VcapH 33, VcapL 34 a supply voltage correction can be added if the basic diagram of FIG. 1 is used. In such case this may be necessary, because the voltage swing at the half bridge, which is equal to Vsupply 2 is added to Vcap1 8.

The control logic CL may in an embodiment be provided by general purpose computer means or dedicated programmable computer means, where monitoring signals may be inputted and the computer means may be implemented to operate the control logic, e.g. by executing computer code implementing the method of the present invention.

Although the present invention has been described in connection with preferred embodiments, it is not intended to be limited to the specific form set forth herein. Rather, the scope of the present invention is limited only by the accompanying claims. Herein, the reference to two switches does not exclude embodiments with more than two switches.

In this specification, certain specific details of the disclosed embodiment such as specific implementation schemes, circuit diagrams, etc., are set forth for purposes of explanation rather than limitation, so as to provide a clear and thorough understanding of the present invention. However, it should be understood readily by those skilled in this art, that the present invention might be practiced in other embodiments that do not conform exactly to the details set forth herein, without departing from the scope of this invention as defined by the claims. Further, in this context, and for the purposes of brevity and clarity, detailed descriptions of well-known apparatus, circuits and methodology have been omitted so as to avoid unnecessary detail and possible confusion.

Reference signs are included in the claims; however, the inclusion of the reference signs is only for clarity reasons and should not be construed as limiting the scope of the claims.

The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A resonant converter for supplying electrical energy from a supply source to a load, the resonant converter comprising first and second series-arranged, controllable switches to be connected to the supply source, a control device for generating control signals for opening and closing the first and second switches, a resonant tank in electrical connection with the first and second switches, the resonant tank comprising a resonant capacitor, wherein one of the first and second switches is turned on, the current flowing in the resonant tank is monitored, or the voltage at a predetermined point in the resonant tank is monitored, and wherein the switch is turned off when a first criterion is fulfilled together with a second criterion or a third criterion, the first criterion ensuring a minimum time has lapsed after the switch is turned on, the second criterion being that the absolute value of the current is reaching a predetermined current level, the third criterion being that the voltage at the predetermined point reaches a predetermined voltage level.

2. A resonant converter according to claim 1, wherein the first criterion is fulfilled when a maximum in the absolute current has been reached.

3. A resonant converter according to claim 2, wherein it is determined whether the current has reached an absolute maximum in a top point or in a valley point, and wherein the control device is controlling the switch in response to whether the current has reached its absolute maximum in a top point or a valley point.

4. A resonant converter according to claim 3, wherein the predetermined current level is chosen based on whether the current has reached its absolute maximum in the top point or the valley point.

5. A resonant converter according to claim 3, wherein the predetermined voltage level is chosen based on whether the current has reached its absolute maximum in the top point or the valley point.

6. A resonant converter according to claim 1, wherein the first criterion is fulfilled when a predetermined time has lapsed.

7. A resonant converter according to claim 1, wherein the minimum time is a predetermined minimum time and wherein the first criterion is fulfilled when the current has crossed a zero point and when the predetermined minimum time has lapsed after the current has crossed the zero point.

8. Control logic for controlling a resonant converter, the control logic comprising output logic for controlling first and second series-arranged switches, a comparator coupled to receive a current in a resonant tank of the resonant converter and a voltage at a predetermined point in the resonant tank, for comparing the current or the voltage to predetermined levels, to send output is sent to the output logic for turning the switch off when a first criterion is fulfilled together with a second criterion or a third criterion, the first criterion ensuring a minimum time has lapsed after the switch is turned on, the second criterion being that the absolute value of the current is reaching a predetermined current level, the third criterion being that the voltage at the predetermined point reaches a predetermined voltage level.

9. A method of controlling a resonant converter for supplying electrical energy from a supply source to a load, the resonant converter comprising first and second series-arranged switches to be connected in operation to the supply source, a control device for generating control signals for opening and closing the first and second switches, a resonant tank in electrical connection with the first and second switches, the resonant tank comprising a resonant capacitor, the method comprising the steps of: monitoring the current flowing in the resonant tank and a voltage at a predetermined point in the resonant tank, comparing the current or the voltage to predetermined levels, and turning the switch off when a first criterion is fulfilled together with a second criterion or a third criterion, the first criterion ensuring a minimum time has lapsed after the switch is turned on, the second criterion being that the absolute value of the current is reaching a predetermined current level, the third criterion being that the voltage at the predetermined point reaches a predetermined voltage level.

10. Computer readable code for enabling a programmable device to perform the method of claim 9.

* * * * *